United States Patent [19]

Sybenga

[11] Patent Number: 4,603,952
[45] Date of Patent: Aug. 5, 1986

[54] PROFESSIONAL STEREOSCOPIC PROJECTION

[76] Inventor: John R. Sybenga, 2009 S. M Extension, Oskaloosa, Iowa 52577

[21] Appl. No.: 486,035

[22] Filed: Apr. 18, 1983

[51] Int. Cl.$^4$ ............................................. G03B 35/02
[52] U.S. Cl. ....................................... 352/65; 352/136; 352/60; 269/246; 269/902
[58] Field of Search ...................... 352/57, 65, 136, 60, 352/62; 269/246, 902

[56] References Cited

U.S. PATENT DOCUMENTS

| | | | |
|---|---|---|---|
| 455,414 | 7/1891 | Searle | 269/246 |
| 1,780,383 | 11/1930 | Green | 352/243 |
| 2,024,111 | 12/1935 | Phillis | 269/246 |
| 2,314,174 | 3/1943 | Steinman | 352/57 |
| 2,329,294 | 9/1943 | Ramsdell | 352/57 |
| 2,364,150 | 12/1944 | Lowenstein | 269/902 |
| 2,413,996 | 1/1947 | Ramsdell | 352/60 |
| 3,267,802 | 8/1966 | Noble | 352/198 |
| 4,002,328 | 1/1977 | Wolf et al. | 269/246 |
| 4,168,885 | 9/1979 | Kent et al. | 352/57 |

FOREIGN PATENT DOCUMENTS

| | | | |
|---|---|---|---|
| 517177 | 2/1955 | Italy | 352/57 |
| 283234 | 1/1928 | United Kingdom | 352/57 |

Primary Examiner—Monroe H. Hayes

[57] ABSTRACT

This invention relates to an attachment for motion picture projectors to utilize stereoscopic film. The invention contains a quick mounting means to mount it on most standard theater projectors, a means to precisely adjust the attachment to the projector and internal adjusting means to accurately align and project stereoscopic images upon the theater screen. The invention is intended to be used by theater personnel who have no special training with stereoscopic film projection and to be used on most standard theater projectors without modifications.

9 Claims, 23 Drawing Figures

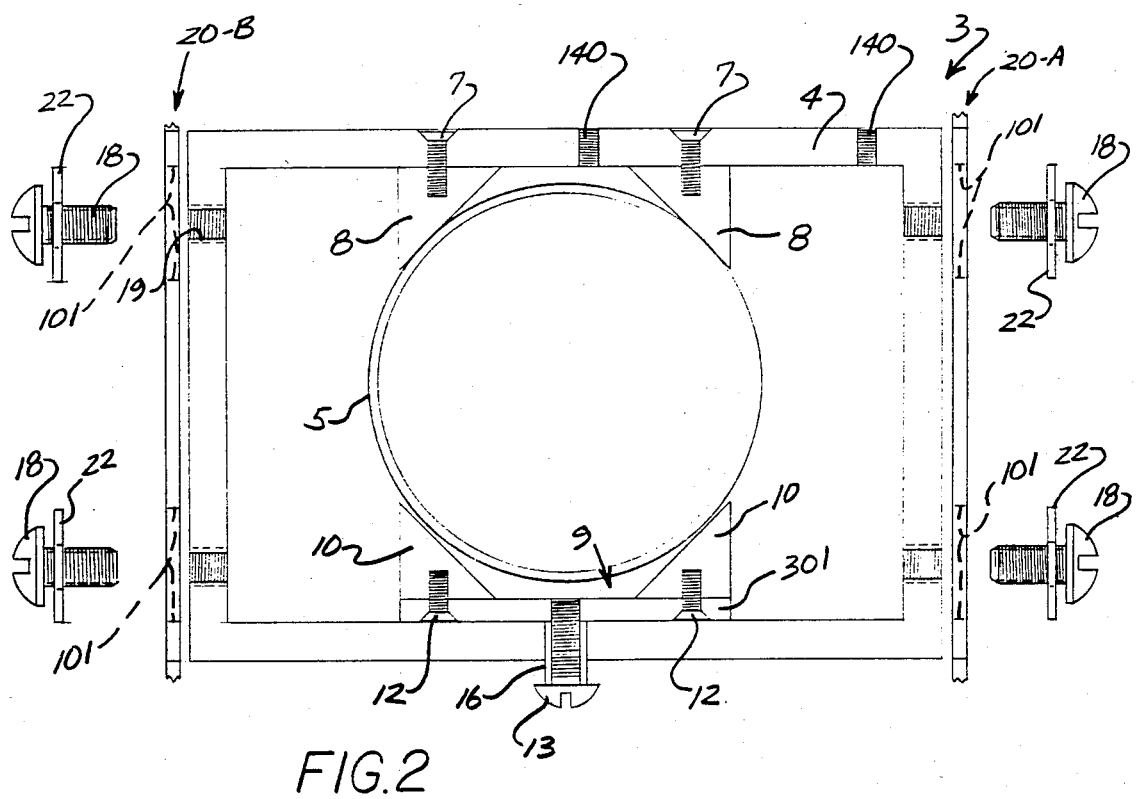
FIG. 2
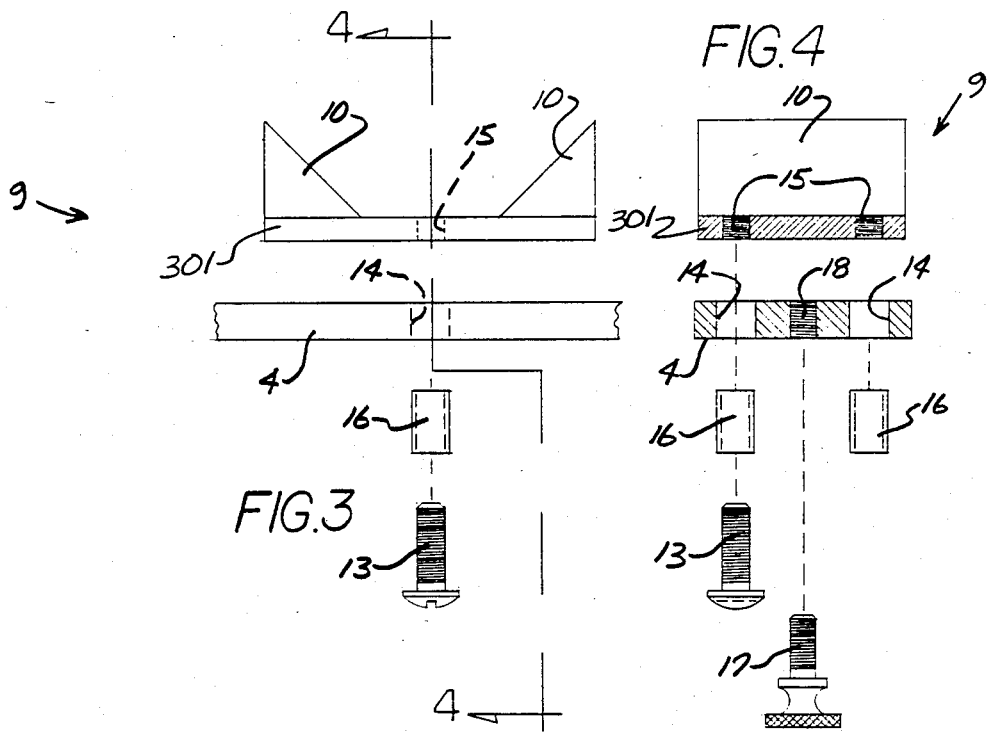
FIG. 3
FIG. 4

PROFESSIONAL STEREOSCOPIC PROJECTION

BACKGROUND OF THE INVENTION

This invention relates to stereoscopic motion pictures and specifically to an improved means for the presentation of single-strip dual image stacked frame stereoscopic films projected with standard theater equipment operated by regular theater personnel.

Heretofore there have been proposals to create stereoscopic motion pictures by incorporating into the area of one normal film frame two separate images comprising similar but not exactly duplicate views of the same scene as would be seen by the right and left eyes of an observer. These twin images are known as a stereo pair. The size, placement, and/or location of the twin images within the confines of the film frame can vary. The most popular being one image placed above the other in a "stack", usually with the left eye image stacked on top of the right eye image, which yields a pleasing wide picture shape. Another popular configuration is to place the twin images one beside the other, while less popular are side-by-side and rotated on end or foot-to-foot, as well as a stacked configuration in which one image is upside-down and/or reversed left-to-right (mirrored) in relation to the other. Providing motion picture films with such configurations are basically simple matters, since relatively few cameras, specialized lenses, or optical printer systems are required during the production of such a film whereas thousands of theaters will ultimately have to show them. Camera equipment is often drastically altered without regard to returning it to normal operation later. Exhibitors, on the other hand, are exceedingly reluctant to alter or sacrifice their projection equipment in any way since these are "bread and butter" machines which must be used day after day on a continuing basis.

There are a number of stereoscopic filming and/or printing processes that yield a stacked-frame configuration. No two brands are exactly the same, and the resultant film frame format specifications thus produced vary considerably.

The presentation of these specialized dual image films to an audience likewise requires the use of special projection equipment.

The criteria for projecting the images, in a manner that the stereoscopic effect can be perceived by an audience, are well known. The twin images must be brought into a superimposed relationship and correctly registered on the viewing screen for accommodation by the eyes. The separate images on the screen must be rendered visible only to the one eye it is intended for, and the other "wrong" image must be concealed from view by that eye. This is usually accomplished by the action of light filtering mediums or materials such as polarizing filters which are used extensively. Two polarizing filters with opposing axis are each placed in one of the image forming light beams. Viewing spectacles with each lens containing a polarizer duplicating the axis arrangement of one of the projection filters are worn by the audience members. The action of the polarizers is such that one image only is visible through one of the spectacle lenses, while the un-wanted image is blocked from view to that eye, and vice versa for the other eye. Thus the right and left eyes can see only the correct image intended for them to see. Unfortunately, the technicans responsible for the camera taking equipment or special printing procedures exhibit little concern in regard to the ultimate presentation of the film, and the means for projection are often an after thought. Often these skilled engineers consider the state of the art and sometimes specialized models of projection equipment found in their laboratories to be typical of the theatrical profession. Thus the equipment which evolves for the projection of any given stereoscopic process is seldom practical for the working projection room environment. The situation involving the presentation of the stereoscopic film to the audience worsens when the absence of knowledge by the regular theater staff, who are not accustomed to dealing with such optical phenomena, is taken into account. Thus, the theater staff are embarrassed by an unprofessional performance and the audience is exposed to considerable viewing distress.

It has been proposed to project the dual image film with special double lens system arrangements housed in a single lens barrel which replaces the standard projection lens completely. The optical centers of the dual projection lens element segments must correspond precisely with the optical axis centers of the twin images on the film. Such a lens system must either be made adjustable to suit the various image center-to-center specifications on the films or an army of separate pre-formulated lens systems must be provided for use with all the slightly differing dual image formats each of which requires its own awkward installation procedure. The polarizing filters must be fitted in close proximity to the outermost lens element in the hottest part of the optical train. Often the oddly shaped dual lens system does not properly fit into the projector's lens mount or receptacle, requiring hasty alterations to the machine. The lens element segments used in the construction of such a system must, out of necessity, be smaller than those found in a full size normal lens, and the unusual semi-circular shape results in an overall low "f" ratio causing considerable light loss on the theater screen. This light loss is further compounded by the production of complete but unwanted repeat or secondary images appearing on the theater screen and auditorium front wall above and below the desired stereo screen image. These must be physically masked from view and the light devoted to their production considered as a general but large loss to the entire screen image. The polarizing filters absorb another large portion of light. Being placed close to the lens elements due to optical requirements also places them in the hottest possible location. Polarizing filters are prone to fading due to their heat sensitive nature. The loss of the filtering action caused by the "burn out" results in the screen images reverting to the naked eye appearance, blurred and garbled, the spectacles worn by the audience having, in effect, become useless. Replacing the ruined filters can be quite a job and entails another lengthy installation procedure. Heat filters inserted into the light beam prior to the polarizers are of limited value, absorb even more light, and yield a definite blue-green coloration of the screen.

Other proposals involve the use of wedge prisms used in conjunction with a standard projection lens. Two wedge prisms are placed together base-to-base forming a bi-prism and inserted into the light path of the screen image. Their refractive qualities tend to divert the top portion of the image downwards and the bottom portion of the image upwards as the image forming light beam progresses to the theater screen. Polarizing filters are inserted in the image path between the wedges and the theater screen, with axis oriented to match the spectacles worn by the audience for appreciation of the stereoscopic effect. The refractive power of the wedges determines the focal length of the standard projection lens, size of the theater screen, and distance from the booth which can be used. A small degree of adjustment can be obtained by pivoting the wedges in unison. It is only by careful calculation that the requirements of a particular theater's system size can be fulfilled for a proper stereoscopic display. The wedge prisms must be achromatic or the screen images will be rendered as a spectrumated smear or blur. Wedge prisms, achromatic, apochromatic, or plain glass all introduce an irritating compound optical distortion in the form of curving or bowing lines plus a non-uniform compressing effect, and due to the base-to-base disposition of the wedges this bowing distortion is reversed in respect to each of the dual images. Because of this distortion it is impossible to attain a suitable superimposed registration throughout the entire screen image. This bowing distortion is accentuated as the wedge prisms are pivoted for adjustment of the dual images into proper register on the screen. The wedge prisms themselves are expensive and difficult to make. Each achromatic pair requiring at least 4 large bubble and strain free glass blanks, 8 surfaces to be optically figured, ground, and polished to a very high degree, and a critical-glass-to-glass cementing procedure. They must be of sufficient size to permit easy access of the entire screen image light beam to pass through them or a considerable light loss due to vignetting results. Such projection devices are large, heavy, awkward, and can cause damage to the lens holder. They are best mounted independently of the projection machine.

Other proposals involve the use of mirrors or reflecting surfaces used in conjunction with a standard projection lens. The purpose of which is to cut the screen image light beam into two halves, each half containing one of the dual images, and re-positioning the halves together in proper superimposed registration on the screen. The present invention is in this category. Most such proposals are usually associated with non-professional uses, intended primarily for amateur stereo slides and home movie applications. In the few proposals directed toward commercial stereoscopic applications the devices were hastily designed and poorly made. and hastily designed. The optical principles and qualities were not utilized to the fullest extent as found in similar high grade mirror optical components used in science and industry elsewhere.

Accordingly the several objects of my invention are to provide a means to easily, properly, and professionally project or present to a commercial theater audience any and all of the differing single film strip stacked-framed format type stereoscopic film productions, regardless of the varying specifications or center-to-center spacing of the dual image pairs.

Another object is to provide this means of stereoscopic presentation without substituting projection lenses, altering or requiring mechanical changes to the standard theater projector which the theater personnel are accustomed to operating.

Still another object is to provide this means of stereoscopic presentation without the necessity of removing and replacing the stereoscopic projection device for the presentation of non-stereoscopic program material.

Another object is to provide the means to easily project most of the single strip side-by-side format type of stereoscopic program material.

Another object is to provide the means to substantially prevent polarizing filter failure due to over heating.

Another object is to provide the means to quickly rectify the effects of a polarizing filter failure if it should happen, or the filter fall victim to other forms of damage, without interruption to the program.

Another object is to provide substantial construction with direct and easy-to-use operating controls governing all the members of the projection device to remedy unusual circumstances that may arise.

Another object is to provide an attaching a means to positively lock and unlock the projection device to and from the projection machine in a quick, easy and repeatable fashion.

Further objects and advantages of my invention will become apparent from a consideration of the drawings and ensuing description thereof.

BRIEF DESCRIPTION OF THE DRAWINGS

FIG. 2 is a rear view of the inner part of the quick mounting device.

FIG. 3 is a partial rear view of the V block mounting device.

FIG. 4 is a partial side view of the movable V block mounting device.

DETAILED DESCRIPTION

Figure 1:
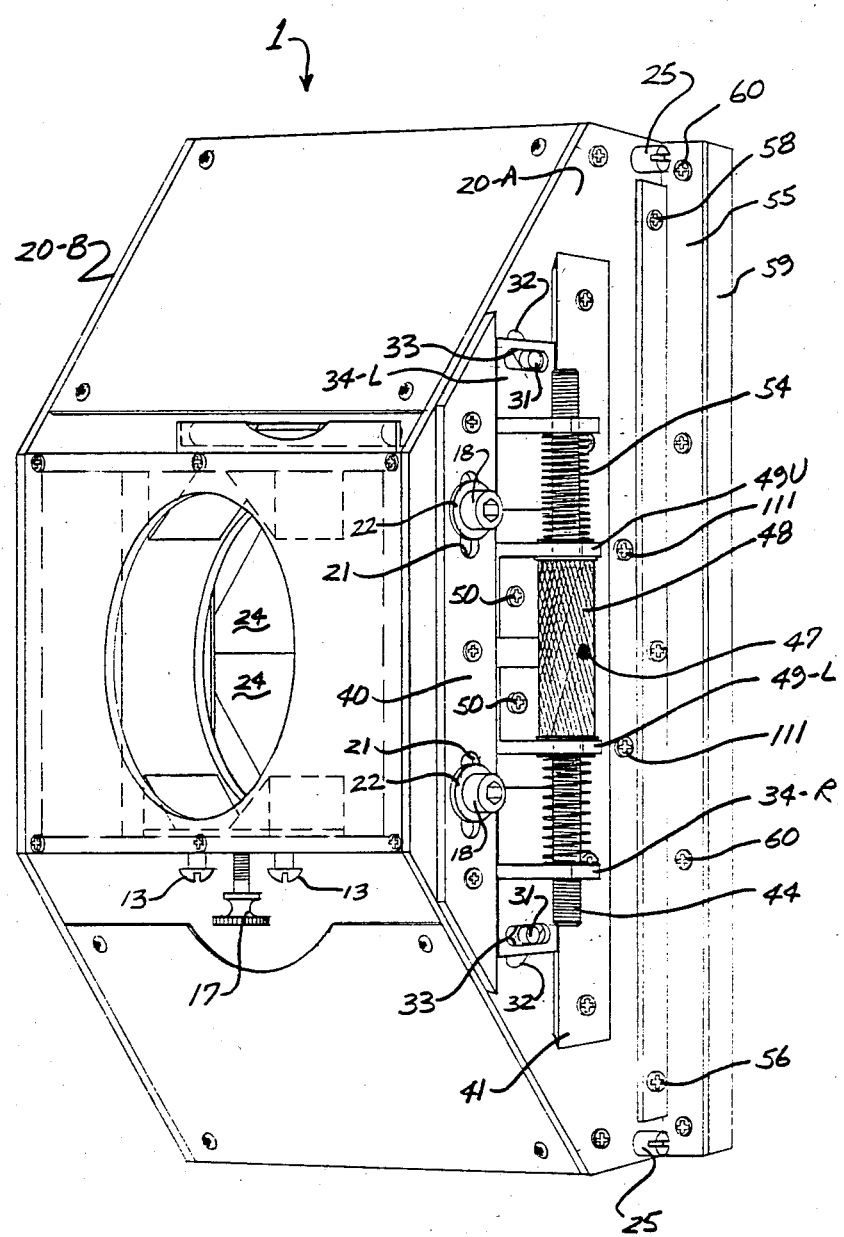
FIG. 1 is a rear-quarterly side view of the device.
Figure 5:
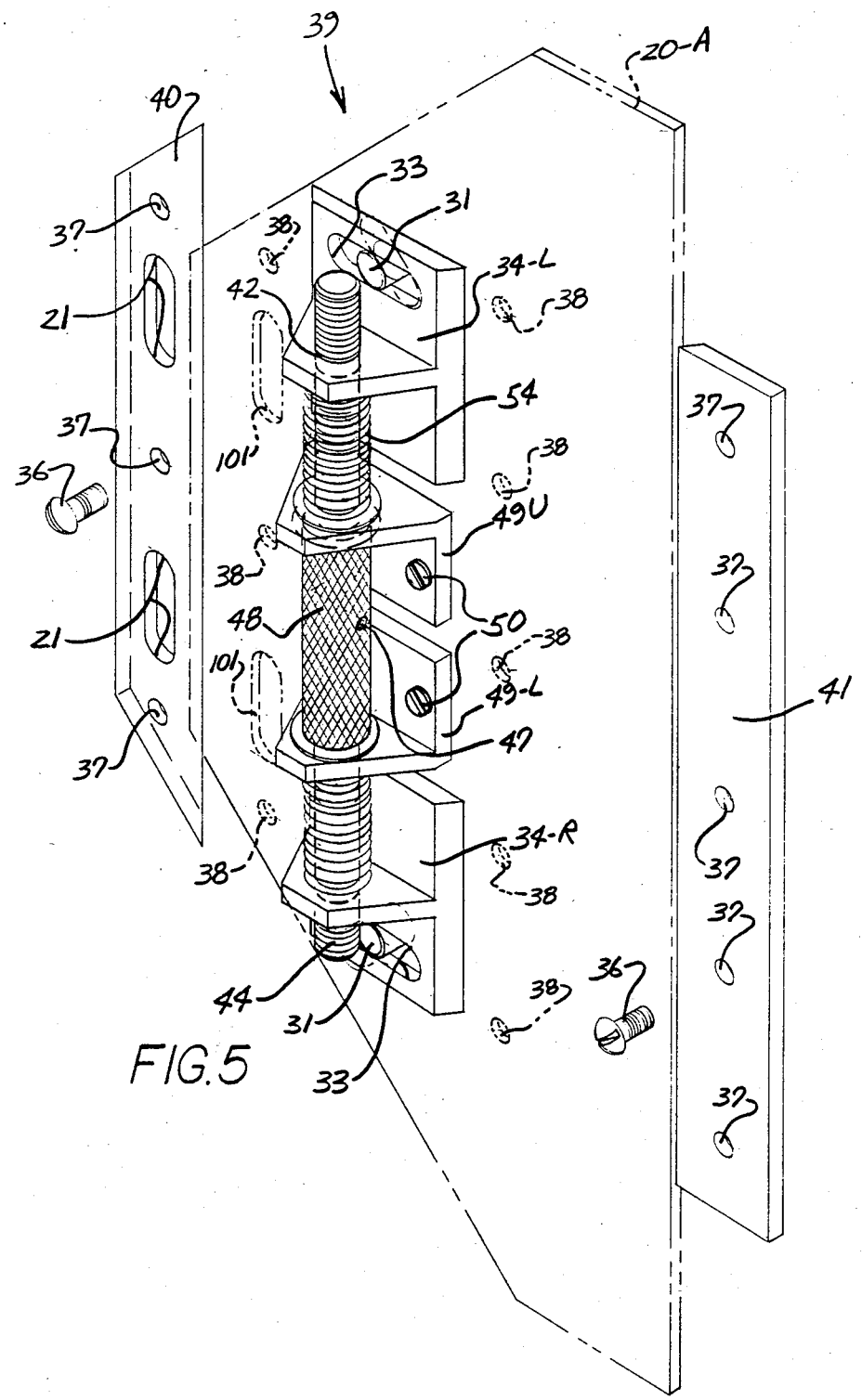
FIG. 5 is a partially exploded view of the right control side of the mirror box assembly.
Figure 6:
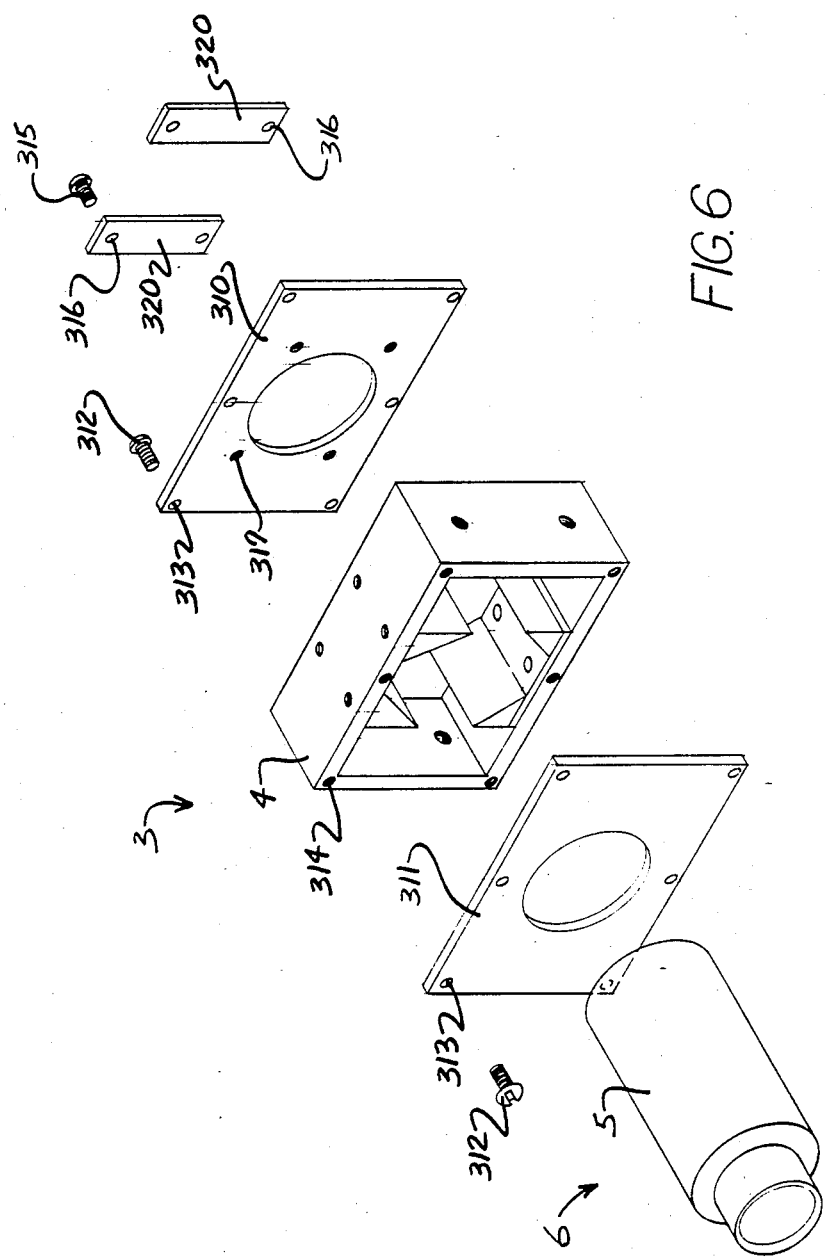
FIG. 6 is an exploded view of the quick mounting device.
Figure 9:
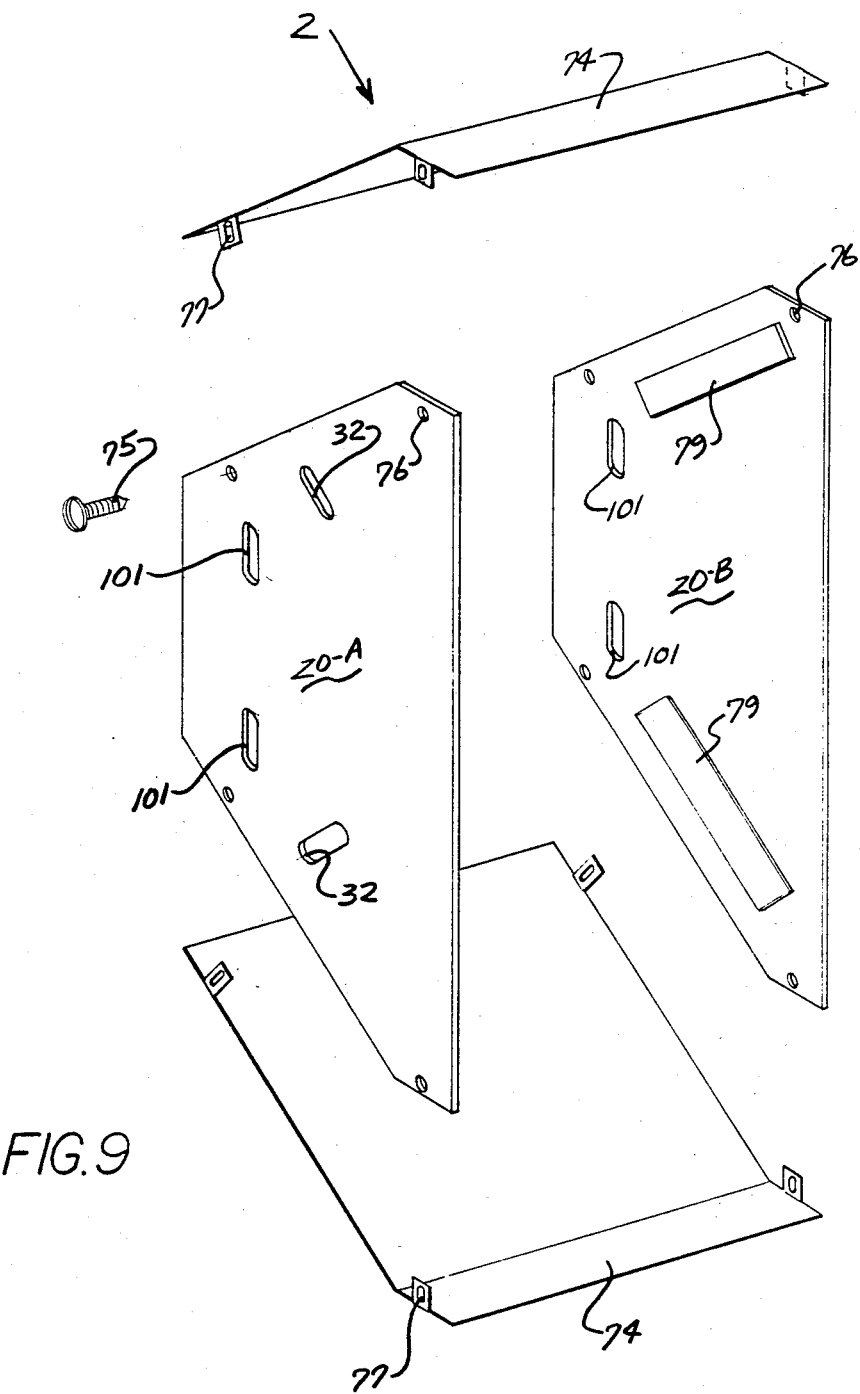
FIG. 9 is an exploded view of the mirror box housing assembly.

Referring to the drawings, the entire stereoscopic projection attachment device, FIG. 1, (7) consists of two major components, mirror housing assembly FIG. 9 (2) and the vice clamp assembly FIG. 2 (3) which secures the device (1) in a rigidly mounted and properly aligned fashion to a standard projection lens barrel FIG. 6 (5) being part of a standard commercially available projection lens system (6). Lens barrel (5) may be of an auxiliary lens used to enlarge the screen image. The vice clamp assembly (3) consists of a rectangular main body frame FIG. 2, (4) which can be an aluminum casting or built up from bar stock. Bolts (7) secure "V" blocks (8) to the ceiling of main frame (4) in a centered, concentric, and parallel with respect to the optical axis of the lens system (6) manner for the proper optical alignment of device (7). On the floor of main frame (4) is floating clamp assembly (9) comprising plate (301) to which are secured "V" blocks (10) by bolts (12), also in a substantially parallel relationship. Floating clamp assembly (9) is retained in frame (4) by bolts (13) extending through holes FIG. 3, (14) and terminating in threaded receptacles (15) located in plate (301). Tubular sleeves (16) fit over bolts (13) and pass through holes (14) in main frame (4), their purpose being to permit bolts (13) to be tightened in threaded holes (15) for bolts (13) retention in floating clamp assembly (9). Shoulder bolts can also be used. Knurled thumb screw FIG. 4 (17) cooperates with threaded hole (18) in floor of main frame (4) where tip of thumb screw (17) will contact the underside of floating clamp assembly (9). Rotation of thumb screw (17) will effect a raising or lowering of flotation clamp assembly (9) and thus enable lens barrel (5) to be clamped firmly. Bolts (13) with sleeves (16) are of sufficient length to permit movement in an up and down fashion of floating clamp assembly (9), the diameter of the heads of bolts (13) are of sufficient size to prevent escape through holes (14) and thus retain floating clamp assembly (9) within the main body frame (4). Front panel FIG. 6 (310) and back panel (311) are secured by bolts (312) through holes (313) terminating in threaded holes (314) located in body frame (4). The location of one set of bolt holes (314) is located dead center between "V" blocks (8) and (10) to form a truss like arrangement with front and back panels (310) and (311) and prevent a spreading of main frame (4) members when thumbscrew (17) is tightened. To front plate (310), secured by bolts (315) through holes (316) terminating in the threaded holes (317) are stop guides (320) whose function is to prevent lens barrels from entering mirror housing too far and damaging inner mirrors (24). The mirror housing assembly (2) is secured to vice clamp assembly (3) by four bolts (18) which enter threaded holes FIG. 2 (19) in the side walls of vice clamp frame (3) and retain main side plates (20A) and (20B) of a mirror housing assembly (2). Slots (101) also correspond and extend through convergence control slide guide FIG. 5 (40). Washers (22) protect slots (101) from deformation by bolts (18). The purpose is for a vertical adjustment of mirror housing assembly (2) in relation to projection lens system (6) which will be discussed in a later paragraph.

Mirror housing assembly (2) is essentially a pyramid shaped housing containing outer mirrors (23) and inner mirrors (24). Outer mirrors (23) are retained in mirror housing assembly (2) in a suspended pivotal or rotatable manner by rods FIG. 11 (25) which extend through holes (26) located in the main side plates (20A) and (20B). Mirror members (23) are secured to rods (25) and (31) by commercially available silicon glue (27), FIG. 12. The use of silicon glue is most satisfactory as it provides a permanent attachment to the glass or body material of the mirror, eliminating costly, elaborate labor intensive, and bulky mechanical mirror mounts. This glue when cured remains in a tough and rubbery state and constitutes a shock absorbing substance offering a margin of protection to all the mirrors during shipment or rough handling. It is dimensionally stable during curing and cannot disfigure the mirror body through flexure or stress. Rods (25) terminate at one end with eccentric assembly (25A) comprising of an eccentric extension (28), bolt (29) which terminates in threaded receptical (30). Eccentric assembly (25A) enables a horizontal tuning adjustment of mirrors (23) which will be discussed in a later paragraph. The preferred embodiment of bolt (29) is one of a commercially available type having a small nylon bulk at the tip to facilitate in making the above mentioned adjustment.

Figure 13:
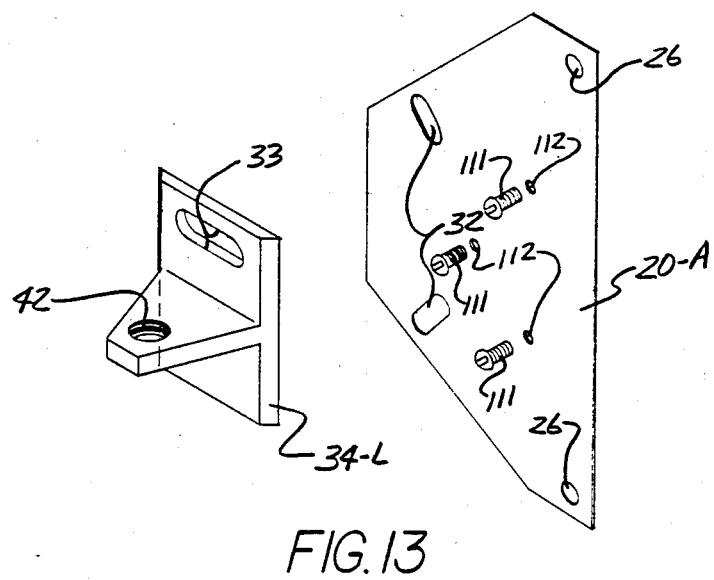
FIG. 13 is a view of the "T" slidably mounted block assembly.

At the rear edge of mirrors (23) are located rods (31) which are secured to mirrors (23) by silicon glue (27). One end of rods (31) protrude from mirrors (23) and extend through wide slots (32) in main side plate (20A) FIG. 13 where the tips of rods (31) engage slots (33) located in T shaped convergence control sliding pads (34L) and (34R). Rods (31) being captive in slots (33) will raise or lower the rear edge of mirrors (23) if convergence control sliding members (34L) and (34R) are moved in an up-and-down fashion, effecting an accurate means to adjust the vertical angular position of mirrors (23). The importance of this movement will become evident in a later paragraph covering the convergence control assembly.

Inner mirrors (24) are secured to mounting bracket (35) in an immobile manner with silicon glue (27). The edges of mirrors (24) facing towards projection lens system (6) are beveled so as to form a fine horizontal "V" shaped pointed corner or seam. Mounting bracket horizontal (35) is rigidly mounted inside of main mirror housing (2) by bolts (111) FIG. 13 extending through holes (112) in main side frame plates (20A) and (20B) and terminate in threaded holes (34) in mounting bracket (35). The surfaces supporting mirrors (24) of mounting bracket (35) are accurately machined to yield angle "X" which is 92 degrees. The importance of angle "X" will become apparent in a later paragraph. /

Figure 14:
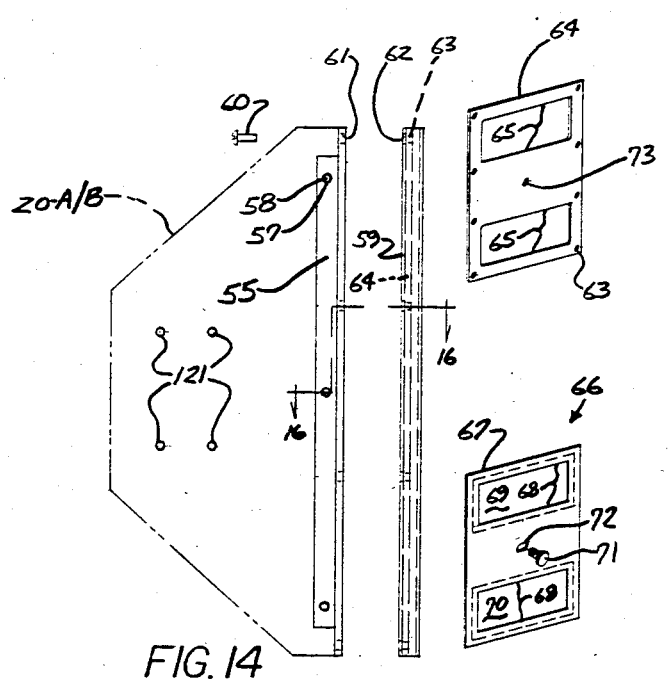
FIG. 14 is a side view of the front wall mounting on the sidewall.

Mounted on main side plate (20A) is the convergence control assembly FIG. 5 (39) with slide guides (40) and (41) secured to main side plate (20A) by bolts (36) entering holes (37) and terminating in threaded holes (38) located in the wall of main side plate (20A). The center hole (37) in slide guide (41) corresponds to hole (38A) in main plate (20A) which also receives bolt (36) which terminates in one threaded hole (34) located in mirror mounting bracket (35). Holes (37) in slide guide (41) are drilled slightly over size in relation to bolts (36) to permit adjustment for a proper sliding fit of sliding pads (34L) and (34R). One edge of slide guides (40) and (41)

are machined so as to form a dove tail track. Captive in the dove tail recess track are sliding pads (34L) and (34R) which contain wide slots (33) and threaded holes (42) which differ from each other in the respect that one hole is left hand threaded and the other hole is right hand threaded. Holes (42) cooperate with the threaded rod (44) on which one end is left hand threaded and the other end right hand threaded. In the mid section of threaded rod (44) is machined annular recess FIG. 10 (45), which receives set screw (46) and prevents scarring of rod (44). Set screw (46) cooperates with threaded set screw hole (47) located midway in the body knurled convergence control mircrometer roller (48) so as to secure roller (48) rididly to threaded rod (44). The annular recess (45) is of sufficient length to permit a tuning adjustment in an up and down fashion of threaded rod (44), the importance of which will be described in a later paragraph. "L" shaped keepers (49U) and (49L) are secured to main side plate (20A) by bolts (50) through holes (120) and terminate in threaded holes (121) FIG. 14 located in main side plate (20A). Outer compression springs FIG. 10 (54L) and (54U) press between keepers (49U) and (49L) and sliding pads (34L) and (34R) effecting a back lash free arrangement capable of refined movement. Spring (54L) is stronger than the spring (54U) thereby keeping micrometer roller (48) pressed against keeper (49L) for a back lash free arrangement capable of refined movement and positive collimation. Teflon washers (125) provide a smooth gliding bearing surface between micrometer roller (48) and keepers (49U) and (49L). It can be seen that rotation of micrometer roller (48) and subsequent rotation of threaded rod (44) will cause sliding pads (34L) and (34R) to travel towards or away from each other owing to the right and left threaded arrangement, guide in dove tail track provided by slide guides (40) and (41).

Figure 16:
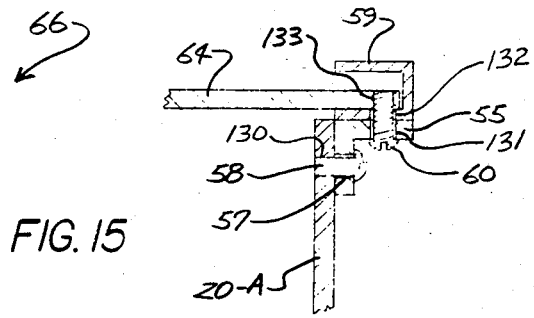
FIG. 16 is a partial top view of the mounting mechanism of the front wall to the side wall.
Figure 17:
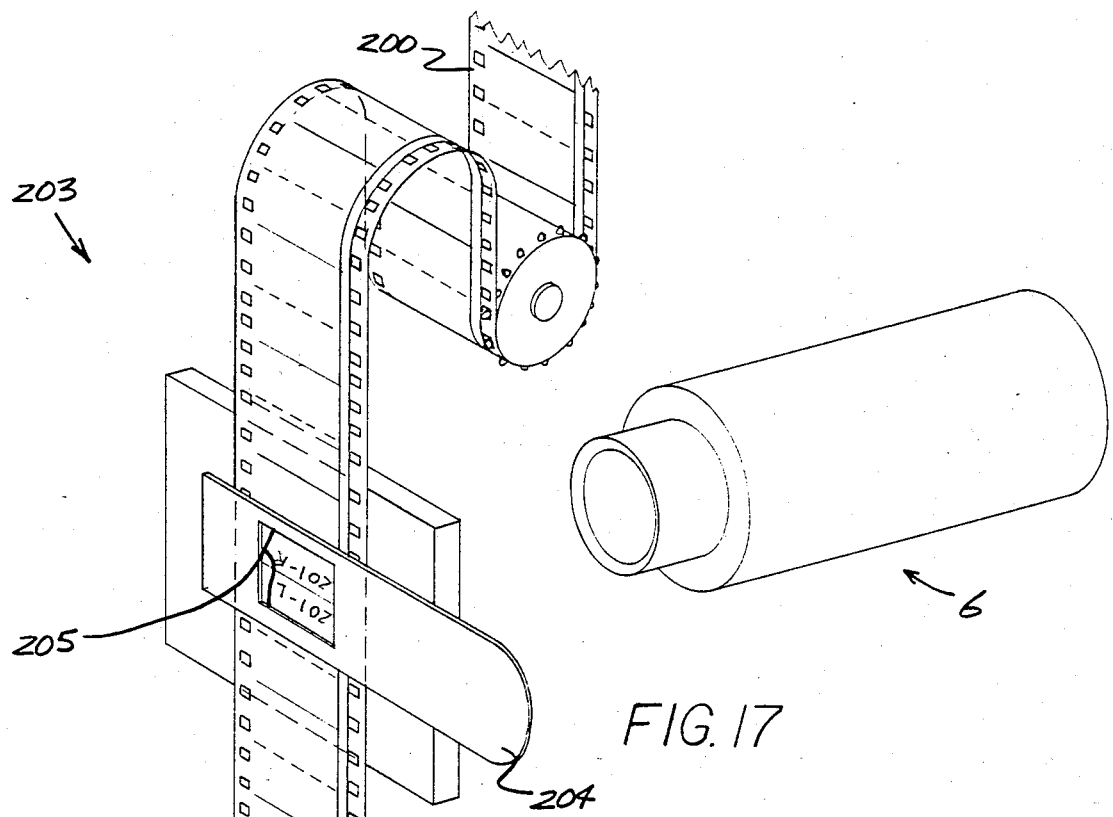
FIG. 17 is a partial diagram view of a film strip threaded thru the projector gate and the relationship of a normal projection lens.
Figure 18:
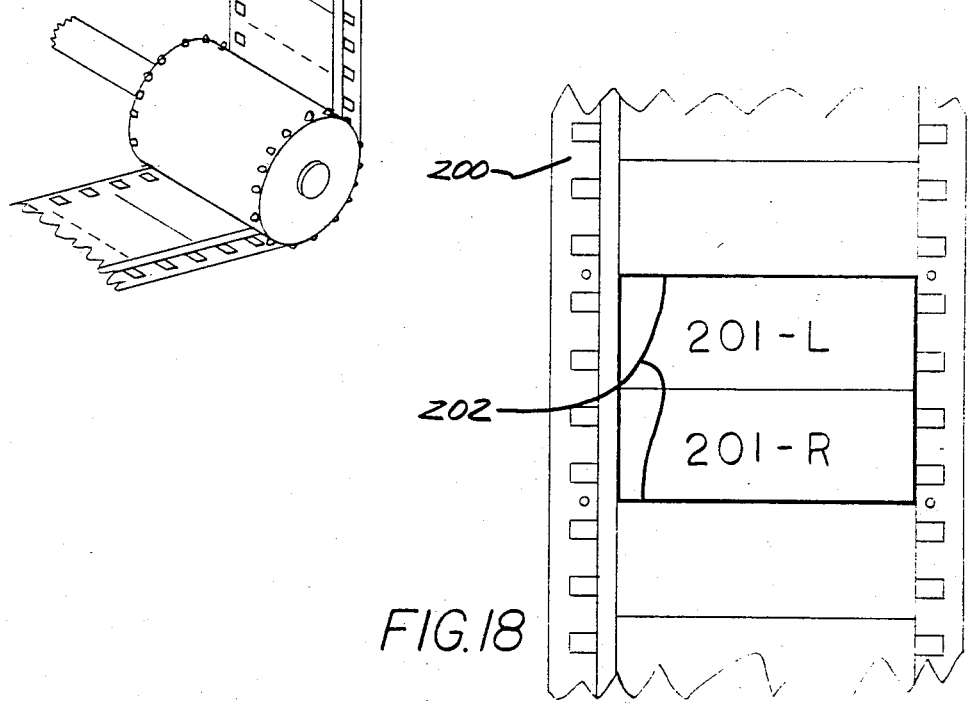
FIG. 18 is a partial view of a stacked frame format Stereoscopic film strip.

Secured to main side plates FIG. 16 (20A) and (20B) are angle brackets (55) by bolts (58) passing through holes (57) and terminating in threaded holes (130) in main side plates (20A) and (20B). Secured to angle brackets (55) are channel receptacles (59) by bolts (60) which pass through holes (131) and (132) in angle bracket (55) and channel (59) terminating in threaded holes (133) located in the margins of front plate (64). Channels (59) are arranged so that their recesses face one another to form a receptacle for insertion of projection filter card assembly (67). Front plate FIG. 14 (64) contains two large apertures (65) which correspond to the exit locations for the light beams (201L) and (201R) emerging from outer mirrors (23). Projection filter card assembly (67) consists of two cardstock frames with large apertures (68). Sandwiched in between and affixed to cardstock frames by a suitable adhesive are commercially available polarizing filters (69) and (70). These polarizing filters must be mounted with extreme care regarding their respective polarizing axis so as to insure that the axis are precisely and positively aligned to conform to the prevailing standards for stereoscopic projection. Colored filters of a suitable nature (not pictured) can be substituted for polarizing filters (69) and (70) to conform to the requirements of the anaglyphic type projection process. Filter assembly (67) is retained in a receptacle composed of channels (59) and front plate (64) by thumb screw (71) passing through slot (72) in filter assembly (67) and terminating in threaded hole (73) located in the center of front plate (64). Removal of thumbscrew (71) frees filter assembly (67) for removal from the device. In this way filters can be changed with no need to interrupt the program.

Protective body covers FIG. 9 (74) are secured to main side plates (20A) and (20B) by sheet metal screws (75) entering holes (76) located in main side plates (20A) and (20B) and terminating in die cut slots (77) located on folded tabs which are a portion of body covers (74). Body covers (74) are so shaped to give clearance for the movement of vice clamp assembly (3) which is adjustably mounted owing to slots (101).

Protective buffer pads (79) are located on the inside surfaces of main side plates (20A) and (20B) and positioned so as to receive the outer ends of mirrors (23) and prevent chipping or damage due to contact with metalic side plates (20A) and (20B).

Figure 8:
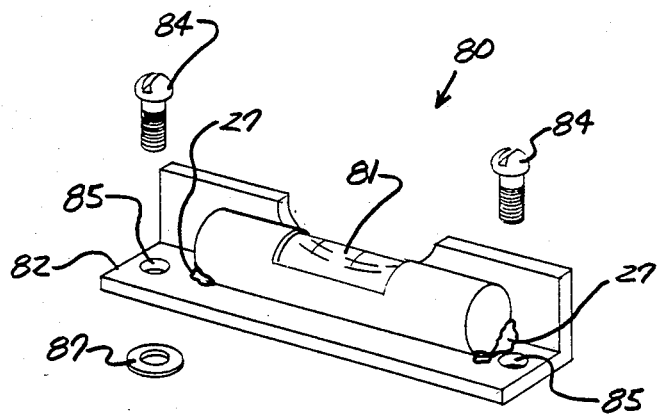
FIG. 8 is a view of the level substitute words-indicator and mounting.

Located on top of vice clamp assembly FIG. 2 and FIG. 8 (3) is spirit level assembly (80) composed of a commercially available spirit level vile (81) attached to protective angle plate (82) by silicon glue (27). Mounting plate (82) is secured to vice clamp assembly (3) by bolts (84) through mounting holes (85) and terminating in threaded holes (140) in the top of vice clamp assembly (3). Calibrating shim(s) (87) are sandwiched as needed under either end of mounting plate (82) to obtain a true reading.

Figure 7:
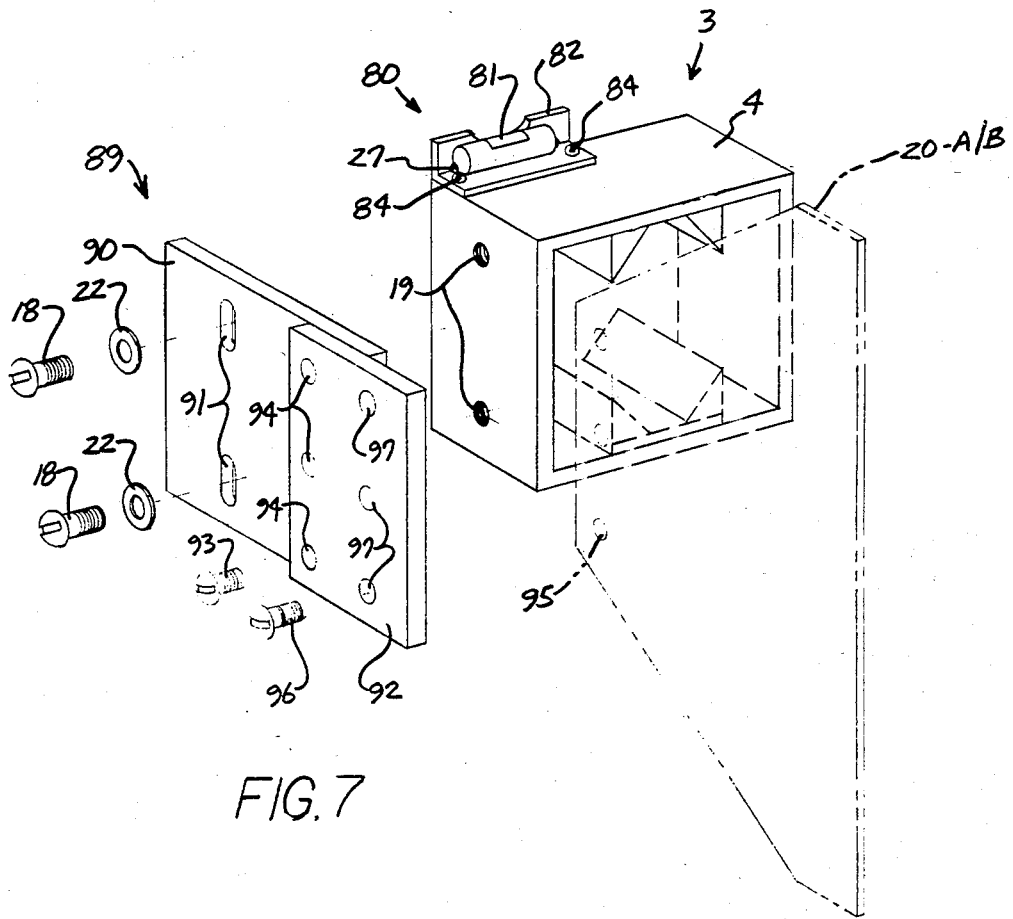
FIG. 7 is an exploded view showing the extension provision.

Side frame extension panel assemblies FIG. 7 (89) consists of plate (90) which act as substitutes for and correspond to slots (101) located in main side plates (20A) to which is secured bracket (92) by bolts (93) inserted through holes (94) and terminating in threaded holes (not shown) located in bracket (90). The frame extension panel assemblies (89) are in turn secured to main side plates (20A) and (20B) by bolts (96) entering through holes (97) in bracket (92) and terminating in threaded holes (95) located in main side plates (20A) and (20B).

A description of the relationships and functions of the various components follows:

A standard physical make up motion picture film FIG. 17, 19, 20, and 23 (200), with photographically composed stereo pair images (201L) and (201R) arranged in a stacked configuration within the confines of one regular frame area (202), is threaded in a commercially available projector (203) (shown diagrammatically) in the usual way. Cinemascope style aperture plate (204) is inserted into the film gate mechanism as for any other type of presentation requiring same. However, regular projection lens system (6) is used, not the anamorphic (cinemascope) lens system. (Not drawn). Light beam (206) passes through opening (205) in aperture plate (204) illuminating exactly one set of stereo pair images (201L) and (201R) found on film (200) and masking off or concealing other areas of the film (200) and surrounding gate assembly. This is the usual function of all such aperture plates, different shapes of openings (205) are used for different masking purposes for various film presentations. In this case opening (205) is the size and shape of the confines of a standard, but maximum height size film frame (202) and contains therein the dual images (201L) and (201R) which are a stereo pair. Raw light beam from lamp (205) after passing through film (200) now becomes light beam (207) and enters projection lens system (6) which in turn focuses whatever image information is contained within the borders of aperture plate opening (205) onto screen (208). The function, optical phenomena, and film motion events of the projection machine are exactly the same as for any other ordinary film, and the stacked dual images (201L) and (201R) would be reproduced verbatim on the screen (208) as depicted diagrammatically in FIG. (21). For the purposes of viewing a steroscopic display the projected stereo pair images (201L) and (201R) on screen (208) must be brought into proper register in a superimposed fashion as depicted diagrammatically in FIG (22). This is accomplished by lowering the placement of stereo pair image (201L) downwards into the central location of theater screen (208), and raising the placement of stereo pair image (201R) upwards so as to occupy the same central location. This is the function of mirrors (24) and (23) contained in the present invention. The criteria for mirrors (24) and (23) involve a high degree of optical surface accuracy, and a suitable deposit of a highly reflective material recognized for optical applications applied to the optically ground and polished surface of the structure. In the preferred embodiment outer mirrors (23) are processed with a reflecting deposit of such a nature that the infrared or "heat" portion of light beam (207) is not reflected but instead passes through the deposit and escapes, while the substantial portion of the visible light beam is reflected. Such commercially available reflective coatings are commonly referred to as dichroic "cold mirrors". The function of the cold mirrors are to reduce the amount of heat contained in light beams (207) and thus protect polarizing filters (69) and (80) from heat damage since polarizers are sensitive to heat. Inner mirrors (24) have reflective coatings of the usual aluminum type. The body or structure material of the mirrors can be of any customary substances such as glass or cervit. Internal imperfections found within the body substance are of no consequence since the light beam (207) never passes through the substance, but is reflected by the coatings.

The angles at which the mirrors meet the light beam are of extreme importance, and vice clamp assembly (3), convergence control assembly (39), and inner mirror mounting bracket (35) exert a vital influence in this regard. Vice clamp (3) not only must retain the entire projection device (1) on the lens barrel (5), but must also provide the foundation of alignment in a substantially perpendicular and centered fashion of projection device (1) to light beam (207). This is accomplished by the rugged construction depicted in FIGS. 2, 3, 4 and 6 constituting the preferred embodiment of vice clamp assembly (3). The "V" blocks (8) and (10) cooperating with floating clamp assembly (9) constitute a large flat surface area in compressed and intimate contact with the cylindrically shaped lens barrel (5). The use of "V" blocks allows a greater deviation in lens barrel sizes that can be accomodated, whereas any other form would not provide the intimate contact necessary for a positive grip. The relatively wide spacing of "V" blocks (8) and (10) also insure positive alignment in a perpendicular and centered fashion of vice clamp assembly (3) and lens barrel (5) not possible by other means. Thumbscrew (17) when tightened with the fingers provides more than sufficient pressure grasp to the lens barrel (5), and yet cannot crush or damage lens barrel (5) as would a tool engaged torgue method. There can be no lens barrel screw-together thread mismatch problems associated with those devices that rely on such a means for connecting devices onto a lens barrel.

Figure 19:
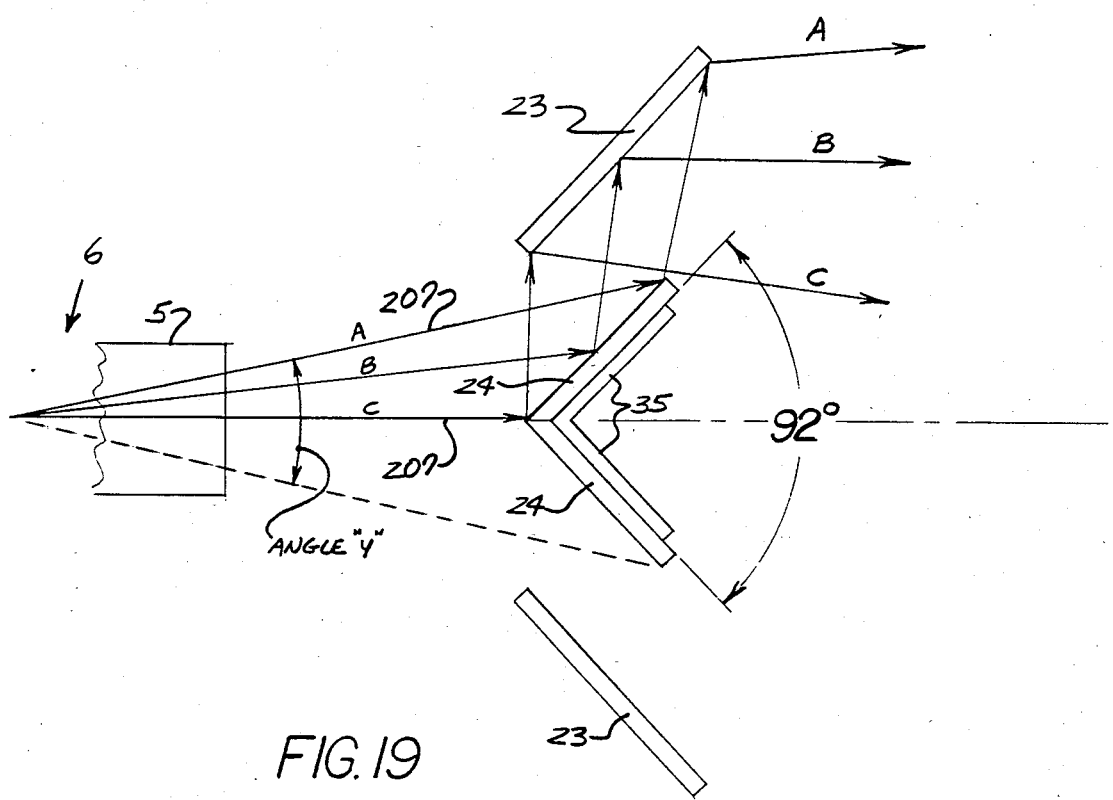
FIG. 19 is a diagrammatical view of the projected image path through the mirror assembly.
Figure 20:
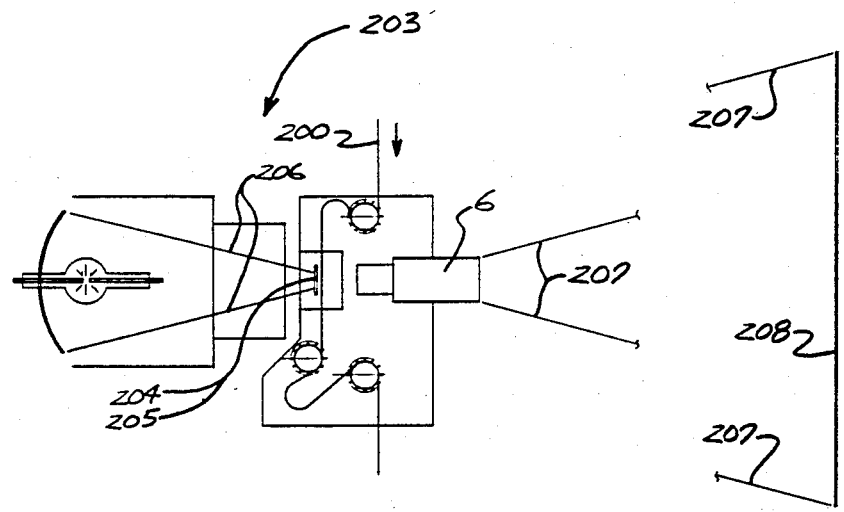
FIG. 20 is a schematic view of a projector-image to theatre screen.
Figure 21:
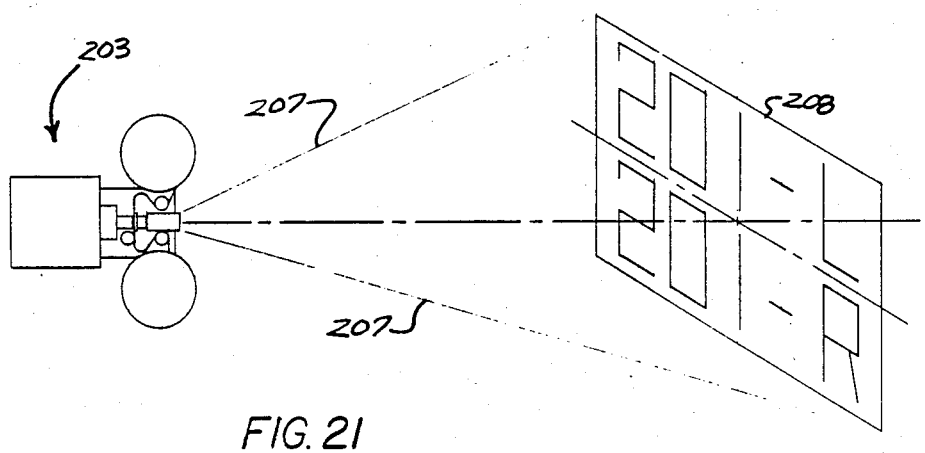
FIG. 21 is a isometric schematic view of the same projector with a Stereoscopic film but without the present invention in place.
Figure 22:
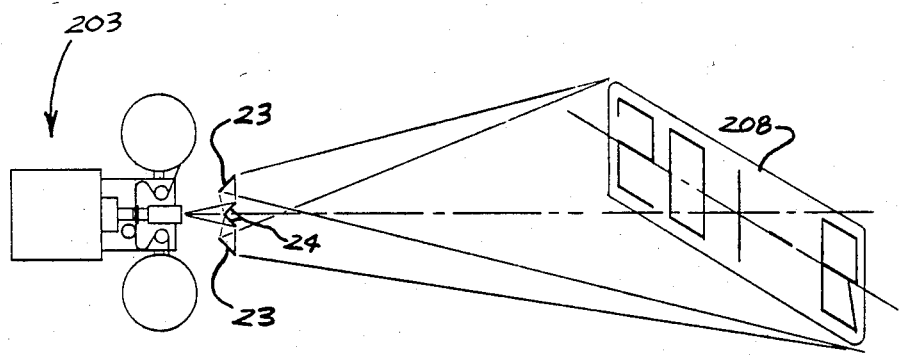
FIG. 22 is a schematic view of the same projector with a Stereoscopic film and with the present invention in place.
Figure 23:
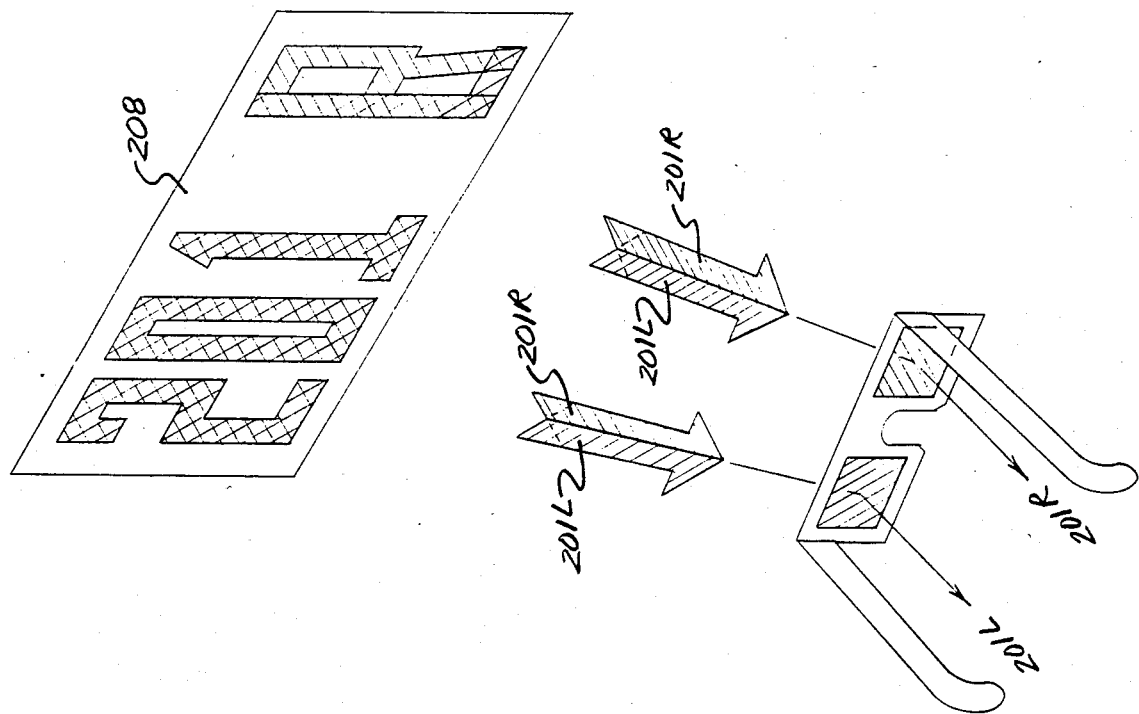
FIG. 23 is a multifaceted view showing the Stereoscopic film strip image being projected by the normal lens, through the mirror assembly and upon a screen in connection with the special polarized glasses used by an observer of the screen images.
Figure 23:
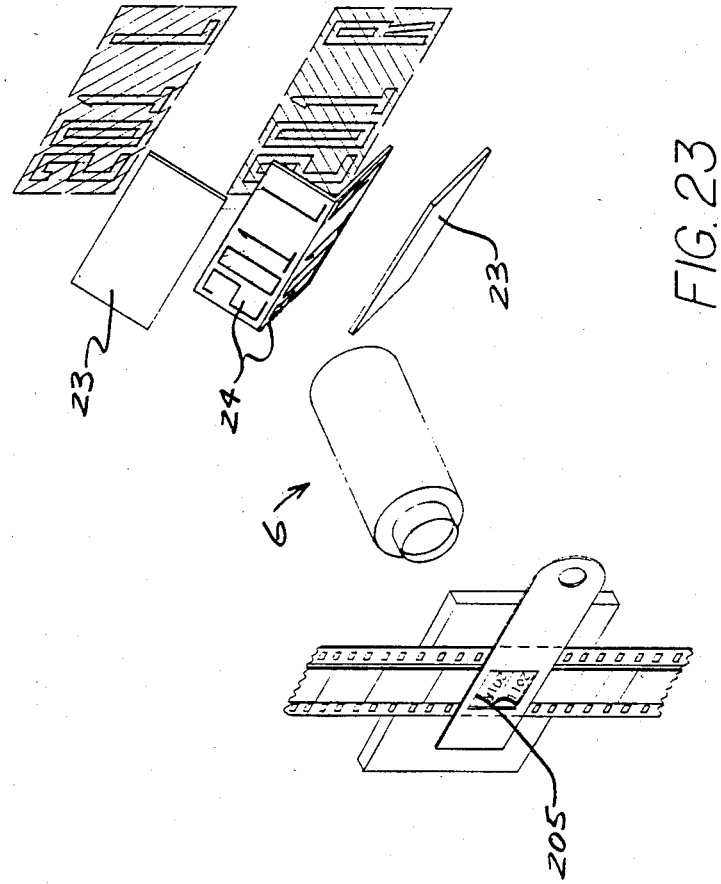

As light beam FIG. 19 (207) enters the mirror housing assembly (2), it falls upon inner mirrors (24), which serve to cut light beam (207) into two equal parts containing embryonic stereo pair images (201L) and (201R). These two beams should be of similar size, and if not mirror housing assembly (2) is not properly placed so as to coincide with the central optical axis of light beam (207). This is a fairly common minor fault found in projection equipment and usually caused by projection lens system (6) not being precisely centered over and/or perpendicular to film frame area (20). For regular projection, it is remedied by simply redirecting the aim of the entire projection machine so as to place projected picture neatly within the borders of the theater screen and causes no harm. The stereo pair images (201L) and (201R) will also be projected neatly within the borders of the screen as expected, but with projection device attached to lens barrel (5) the light mean (207) will not pass exactly through the central axis of the projection device (1). One of the mirrors (24) will receive a "bigger share" of beam (207), resulting in one of the images (201L) or (201R) being brighter than the other, or having a portion cropped off, and causing subsequent viewing distress to the audience. An adjustment to compensate for this condition is provided by slotted holes (101) (or slots (91) if extension panels (89) are in use) located towards rear of main side plates (20A) and (20B). Loosening bolts (18) will render entire mirror housing assembly (2) free to slide up or down as needed in relation to the stationary vice clamp assembly (3) and lens system (6). The correct position is easy to determine visually, and is not regarded as entirely critical. This adjustment has no influence upon the location of images (201L) or (201R) on screen (208). Light beam (207) falls upon mirrors (24) and is cut into two halves which are subsequently reflected in opposite directions. It should be considered that these light beams are becoming progressively larger as they travel to the theater screen, and since most theaters have a large size screen and a relatively short "throw", or distance from the projector to the screen, it can be seen that the images are definitely becoming larger even during a short distance of travel. This phenomena is made all the more acute by exhibitors desiring the use of auxiliary imge enlarging optical systems discussed in a later paragraph to make the screen images (201L) and (201R) large enough to fill the extensive size screen normally associated with anamorphic presentations such as Cinemascope. These image enlarging systems are in prevalent use with the stacked-frame 3-D process and should be considered a normal or integral part of the projection requirements. With this in mind reference is directed to figures (19) depicting a detailed observation of the path of light beam (207) as it is divided by mirrors (24) into two diverging halves which contain embryonic stereo pair images (201L) and (201R) respectively, and detailed for mirrors (23) as found in the construction of my invention. It can be seen that light beam (207) is already quite large as it issues from lens barrel (5) and its rays are diverging at angle "Y". The exact number of degrees of angle "Y" depends upon the focal length of projection lens system (6) in use at a particular theater and therefore cannot be specified. It is also problematic as to whether a image enlarging lens system is in use as far as angle "Y" is concerned. What is important is to provide inner mirrors (24) with a large enough surface size to "catch" all the rays of a lens system (6) that might be encountered in a theater with an unusually large screen and an unusually short throw. (Distance to screen). At the same time it is important to keep the size of all mirrors and thus the entire device within reasonable dimensions. This is possible if inner mirrors (24) are arranged in relation other than the customary 90 degrees. Referring specifically to FIG. 19 of which only one of the identical image path will be discussed, the inner mirrors (24) are fitted at an angle of 92 degrees. With this arrangement it can be seen that rays (A), (B), and (C) are reflected at obtuse angles toward outer mirror (23), that ray C, the central ray will contact the outer mirror (23) at lower rear edge of outer mirror (23) and ray (B) will contact the center of outer mirror (23), ray (A) will contact the leading or front edge of outer mirror (23), thus the size of the device (1) is kept compact by the 92 degree angle of the inner mirrors (24).

A further enhancement of this principle can be applied by arranging the convergence control so as to have the front most edges of outer mirrors (23) remain in a fixed but pivotal situation, while the rear edges move in a vertical reciprocating fashion. If the outer most edges of mirrors (23) were to rise and lower to effect proper convergence, ray A might miss mirror (23) leaving that portion of the stereo pair images (201L) and (201R) absent from screen (208). The preferred embodiment of movable rear edges of mirrors (23) also permits the entire convergence control assembly (39) to be located in a mechanically desirable position in the central area of main side plate (20A).

The function of convergence control assembly (39) is to provide a means to position the proper angle of outer mirrors (23) to precisely the desired degree so as to divert the paths of the light beams, and hence stereo pair images (201L) and (201R), as needed, to effect a proper superimposed registration for viewing on screen (208). Since no two stacked-process brand names or experiments adhere to standards, pertaining to the center-to-center specifications or spacing of stereo pair images, it can be seen that variations or register or superimposition of screen images (201L) and (201R) will occur if a projection apparatus of fixed convergence suited for one particular brand is used with a differing brand. It can also be seen that if a projection device with a limited convergence adjustment range is used for a particular brand successfully, that the same device may, under some circumstances not have a sufficient range of adjustment to project a different brand in the same theater. Other devices which have an awkward convergence control adjustment system, especially those employing independent individual image placement will at best encounter a difficult arrival to proper convergence, and if two dissimilar brands of program material are attempted as a "double feature" the necessary time period for making the adjustment(s) can be of a most irritating nature to the audience. The preferred embodiment of the convergence control is seen in FIG. 5. It is simple, direct, easy to make, fast and accurate, and fool proof. With this arrangement the operator can switch between differing program material instantly without imposing viewing distress upon the audience. If is also capable of being remotely controlled, with the addition of a small servo motor and control means, for automated theaters. (Servo not shown). Many theaters are obligated to exhibit paid contract screen advertising films and/or previews of upcoming attractions, a vital business function. Few, (if any) of these films are in a stereoscopic format. The present invention is entirely capable of projecting regular "flat" films without the need to remove it from the projection lens. The screen appearance of these "flat" films is exactly the same as that of a normal projection situation without the projection device in place. That is there is no "phony depth effect" implied. This is made possible by the exceedingly wide range of adjustment in the convergence control and accomplished by turning the micrometer roller (48) where no alteration to the placement of images on the screen occurs. In effect the top half of the image is placed or butted horizontally against the bottom image half which yields a whole image. When the stereoscopic program material is encountered a simple turn of the micrometer roller (48) is all that is required to bring the dual images into superimposed registration for the stereoscopic presentation. The threads on threaded rod (44) should be very fine to insure a smooth and accurate movement with wide latitude. Slots (33) should be of close tolerance to accept rods (31) in a slidable but back lash free manner. Slots (33) should also be of sufficient width to completely allow for the arc-of-travel of rods (31). The bolt holes (37) on slide guide (41) are oversize so as to allow for proper adjustment to insure an efficient sliding motion of slides (34L) and (34R).

Figure 10:
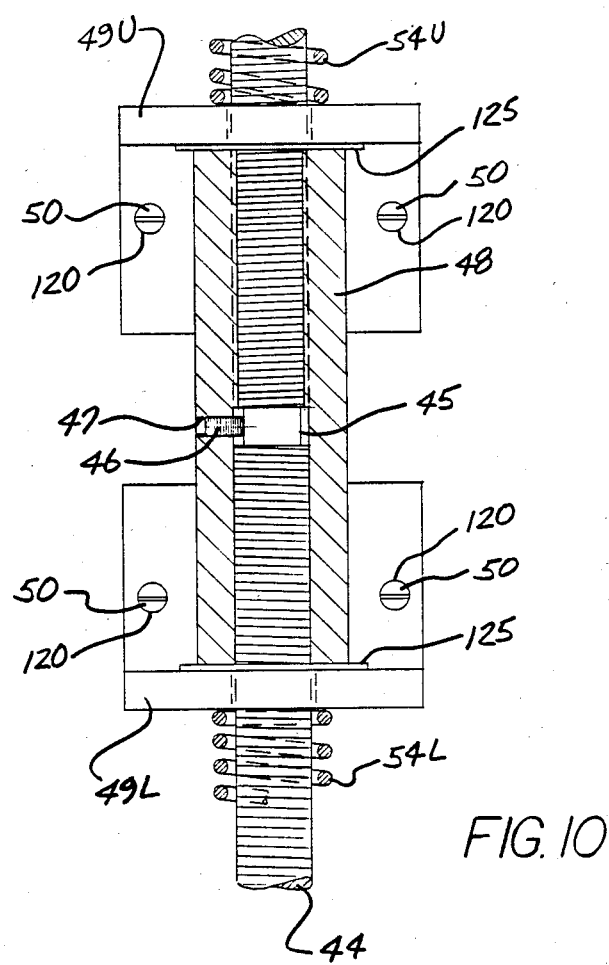
FIG. 10 is a cut away side view of the adjusting means micrometer roller assembly.

The unthreaded portion of the bore in micrometer roller (48) FIG. 10 should be of sufficient size and smoothness to allow free movement of threaded rod (44) during initial manufacturing calibration. Annular recess (45) should be of sufficient length to allow a tuning adjustment "run" involving the locations of slides (34L) and (34R). It is unlikely that during manufacture of the device the positions of slots (3) in slides (34L) and (34R) will, be chance, be in the exact location necessary for stereo pair images (201L) and (201R) to be located exactly in the center of the screen as desired. Although proper superimposition occurs, they will fall in unison, either above or below the central target area of the screen. To compensate for this, set screw (46) is loosened, and threaded rod (44) is prevented from rotation with the fingers while micrometer roller (48) is carefully revolved causing threaded rod (44) to travel upwards or downwards as needed owing to the threaded portion in the top half of micrometer roller (48). This movement also raises or lowers, in unison, slides (34L) and (34R) within slots (33) and alters the position of captive rods (31) and this attached mirrors (23), also in unison, until the images (201L) and (201R) are properly centered as required on the screen (208) at which time set screw (46) is tightened in annular recess (45). This adjustment can be considered as a part of manufacture of the device as the user will probably never need to use it, even if he does it is simple to effect.

Figure 11:
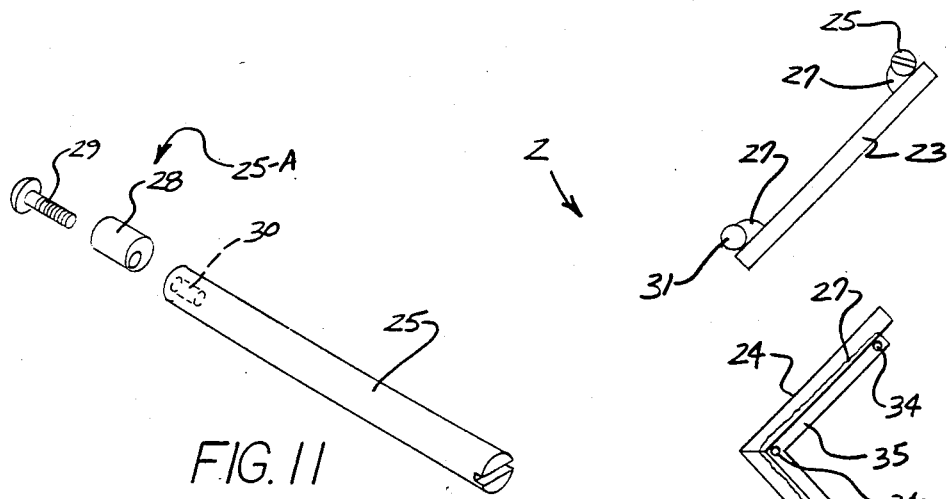
FIG. 11 is a view of the suspended mirror bearing shaft with eccentric upper or outer mounting points adjustment.
Figure 12:
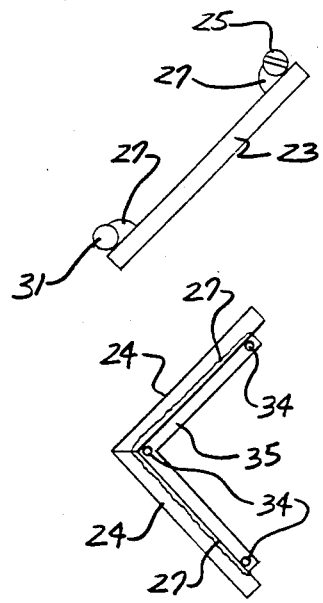
FIG. 12 is a side view of the mirror assemblies in combination.

Another tuning adjustment involves rods (25) FIG. 11 carrying outer mirrors (23). It is also highly unlikely that during the manufacture of the device, that holes (26) in main side plates (20A) and (20B) will chance to be in precise alignment with each other causing rods (25) and subsequently mirrors (23) to be slightly out of level in a horizontal fashion, causing stereo pair images (201L) and (201R) to be diverted to the left or right by some degree on screen (208), as well as assume a slightly rotated-out-of-level mode. This condition, if allowed to persist, would cause considerable viewing distress for the audience. Provision is made to correct this by eccentric assembly (25A). As can be seen, rods (25) are of insufficient length to pass through hole (26) in main side plate (20A) and extend into hole (26) of main side plate (20B). Eccentric extension (28) when added to the length of rod (25) by long bolt (29) will permit the rods (25) to be suspended rotatably between side plates (20A) and (20B). Long bolt (29) preferably should be of the type which has a nylon or similar material bulb at its tip, the purpose of which to keep the bolt in a semi rigid torque state even though it may not be tightened. To make the mirror leveling adjustment, slightly loosen bolt (24) so as to render eccentric extension (28) free to revolve and thus lift or lower one outer edge of mirror (23), to compensate for any irregularities during manufacture, at which time bolt (29) is firmly tightened. Screw driver blade slot in other end of rod (25) facilitates the tightening. This can also be considered as part of the manufacture of the device, but can also be easily carried out in the field when necessary.

Horizontal convergence adjustment is effected by slightly rotating the entire device (1) around lens barrel (5) FIGS. 1 and 8. When the projection device has been properly collimated during manufacture proper, horizontal convergence is automatically attained when the device is mounted substantially level. To facilitate rapid and accurate installation of the unit, bubble level assembly (80) is mounted onto the upper surface vice clamp assembly (3). Collimation for accurate reading is effected by addition of shims (87) as needed under either end of bubble level support (82). An error in horizontal convergence can cause eye strain by causing the eyes of the audience to either "cross" or "toe out" in an attempt to see the stereo images (201L) and (201R). The use of the bubble level eliminates the need for an elaborate and time consuming-installation "ceremony" involving a reel or loop of custom target film, or resorting to pulling the aperture plate halfway out so as to get a vertical shadow plane on the screen from which to adjust the projection device. It also enables the projection device to be readily removed from the lens barrel and properly re-installed at any time.

Figure 15:
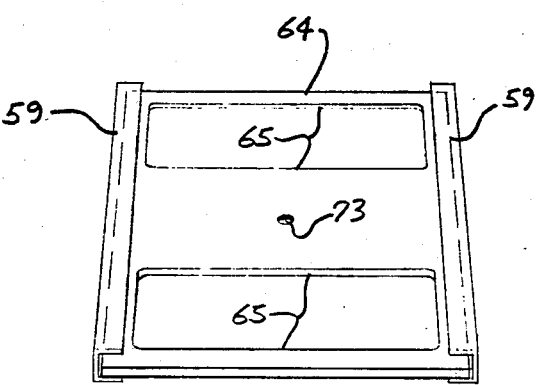
FIG. 15 is a horizontal view of the front wall and filter device installation.
Figure 15:
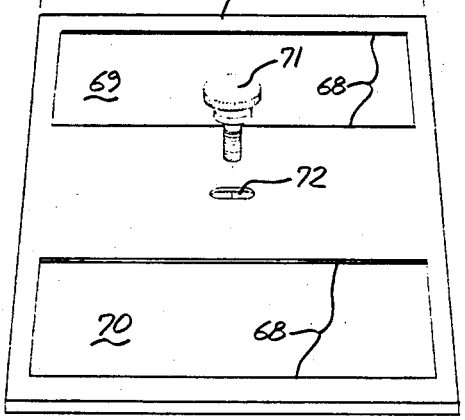

Commercially available polarizing filters, mounted and positioned with axis arranged to correspond to the prevailing standards, are sandwiched in cardstock frames assembly (67) FIG. 15. The filters must be of a good optical quality so as not to degrade the images passing through them. They must also have sufficient filtering power to provide a substantial extinction from view of the one unwanted screen image by its companion polarizing filter serving as one of the lenses in the spectacles worn by the audience to resolve or segregate superimposed stereo pair images (201L) and (201R) on screen (208) FIG. 23. If these polarizing filters are not of sufficient filtering power the audience will experience a general double looking blurry mess resembling the naked eye appearance of superimposed images (201L) and (201R).

It is often desirable to enlarge the size of the projected screen image so as to fill the full size screen associated with the various anamorphic process such as Cinemascope. There are commercially available auxiliary projection lens attachments which adjustably adapt the theaters own projection lens system (6) until the desired degree of the screen image enlargement is obtained. These are basically Gallaleian telescopes used in reverse. A negative and a positive lens combination usually mounted in a sliding or telescoping tube arrangement, which alters the focal length of the main projection lens and thus the size of the screen picture. Usually the stationary section of the tubular housing is of the same outside diameter as a standard projection lens barrel and is screwed into the threaded end of the projection lens barrel much like an extension tube. The sliding portion issues outwardly from within the stationary housing and can extend about 2 inches, FIG. 7. For this reason extension panels (89) can be attached to the rear of mirror housing main side plates (20A) and (20B) and allow ample room for the sliding portion to protrude towards mirror housing (2). Vice clamp assembly (3) is removed from position between main side plates (20A) and (20B). Extension panels (89) are bolted onto main side plates (20A) and (20B) by bolts (96) through holes (97) terminating in threaded holes (95) located in main plates (20A) and (20B). Vice clamp assembly (3) is then put into position by bolts (18) in substitute slots (91), the up and down adjustment is exactly the same as for use in slots (101) located in main plates (20A) and (20B). Stop guards FIG. 6 (320) located in the front of vice clamp assembly (3) may have to be removed for clearance of the sliding portion of the zoom lens.

The duties concerning the use of the present invention for the projection of a stereoscopic presentation by the operator are simple and straightforward. The dual image film (200) is threaded in a normal projector (203) in the usual way. The Cinemascope aperture plate is inserted in the projector's gate receptacle in the usual way. The zoom attachment is used (not shown) simply threads into the end of the projection lens barrel. The present invention is attached in place on the projection lens barrel (5) while observing the bubble level (81). The machine is started and the screen observed. The micrometer roller (48) is revolved until the two stereo pair images come into proper register in a superimposed fashion. Differing brands of stacked-frame stereoscopic film can easily be presented on the same program by a simple adjustment of the convergence control via micrometer roller (48). If a polarizing filter should begin to fade it can be replaced "on the fly" by a new one without interruption to the show.

The foregoing disclosures of the projection device have dealt primarily with the stacked-frame process because it is the most popular and most likely to be encountered in a commercial theatre. It should be noted that the present invention can also be used for many of the side-by-side format processes as well. In this case the position of the stereo pair images on the film are of a side-by-side formation. (Not drawn). The projection device is then placed on the projection lens barrel rotated 90 degrees from the above mentioned description. The relation of the polarizing filter axis configuration also remains the same with regard to prevailing standards when in this position. Some side-by-side films have the left eye image on the left-hand side of the frame, others have it on the right-hand side of the frame. The net result is that the projection unit must be mounted with the convergence control either located on top of the projection device for some films, or on the bottom for others. Some side-by-side format films are often used in conjunction with anamorphic projection lenses to effect a wider picture shape. The present invention is capable of such use with a modified vice clamp body (not drawn) to accomodate the larger size anamorphic projection lens system.

In describing and illustrating the preferred embodiment of my invention, I have used specific terms and descriptions, these terms and descriptions are used in their generic sense only and not for purposes of limitation.

That which is claimed is:

1. An improved apparatus for the presentation of stereoscopic images utilizing program material in which the right and left eye stereo pair images are contained upon a single strip of transparency film, such as motion picture film, said images situated in a one-above-theother configuration, to be projected upon a viewing screen surface by conventional and unaltered projection equipment utilizing an ordinary projection lens system to be used in conjunction with my invention comprising a combination of:

(a) an attaching means with two upright side walls, a horizontal top wall, and a horizontal bottom wall formed as one unit with two protruding members rigidly attached to the central innermost portion of said top wall and facing downwardly, said protruding member being suitably fashioned to form a means capable of receiving a cylindrically shaped object, such as a projection lens barrel, a movable plate member adjacent to said bottom wall, an adjusting means utilizing a rotatable threaded rod member introduced upwardly through said bottommost wall and in contact with the underside of said movable plate so as to apply force to and cause movement of said movable plate toward or away from the said upper receiving surface thereby providing a means for receiving and grasping a said cylindrically shaped object, (b) a housing assembly comprising two upright side walls, a top wall, a bottom wall, and a front wall containing suitable openings, the rear of said housing assembly being slidably fitted onto said upright side walls of said attaching means in a manner allowing a vertical sliding motion of said housing assembly relative to stationary said attaching means, said slidable motion thereby provides a means to adjust and align said housing assembly so as to be concentric with the longitudinal axis of said cylindrically shaped object being so grasped by said receiving and grasping means, (c) a securing means to arrest said sliding motion at any position, (d) a "V" shaped member extending horizontally and affixed between said upright side walls of said housing assembly and bearing two optical reflecting mirrors so aligned with the closed end of said "V" configuration pointing rearwardly and with the reflecting surfaces of said mirrors facing outwardly with said reflecting surfaces fixed at an angle of 92 degrees, (e) a shaft member suspended rotatably within and between the uppermost portion of said upright side walls of said housing and attached to and bearing the frontmost edge of another reflecting mirror member, the reflecting surface of said mirror member facing frontwardly, (f) a second identical shaft member also suspended rotatably within and between the lowermost portion of said upright side walls of said housing assembly, also attached to and bearing the frontmost edge of an identical second reflecting mirror member orientated invertedly to the first said rotatably suspended mirror, but with reflecting surface also facing frontwardly, (g) a second set of shaft members affixed to the rearmost edge of each said rotatably suspended mirror members, one end of each said second shaft member extending through suitable openings in one said upright side wall of said housing assembly, (h) a mirror reflecting angle adjusting means attached to the outside central portion of one said upright side wall of said housing assembly and comprising of a cylindrically shaped micrometer roller member mounted rotatably but captively between a top and a bottom "L" shaped mounting bracket members which are affixed to said upright side wall, a rotatable threaded rod member mounted lengthwise and midway within said roller member by means of a suitably threaded hole, said threaded hole also containing a means to arrest the turn-on-thread rotary motion of said threaded rod member, said threaded rod member having left hand threading on one end and right hand threading on the other end to suit a top and a bottom "T" shaped members movably but captively mounted on said upright side wall, one of which has left hand threaded receptacle and the other having right hand threaded receptacle, said "T" shaped members each containing angular slot into which said protruding ends of each said rearwardmost mirror bearing shaft engages thereby providing a means for precisely adjusting the reflective angles of said mirrors in an opposidly fashion and in exact unison by the same degree simultaneously, and also providing a means for attaining an independent adjustment of said reflecting angles, also achieved in unison, but relative to and between the rotational angularity of said rotatably suspended mirror members, said independent adjustment accomplished by manipulation of said means to arrest said turn-on-threads rotary motion of said threaded rod member situated within said cylindrically shaped micrometer roller member to a different rotational position for arrestment thereby providing a means to alter the placement in a vertical fashion of respective said left and right eye stereo pair images upon said viewing screen, (i) an additional mirror orientating adjustment means not related to, and with a distinct purpose from the first said adjustment means, said additional mirror orientation means comprising of an eccentric extension member rotatably affixed to, and provided with a means to arrest said rotation at any position, one end of each said rotatably suspended mirror bearing shaft members, said eccentric members being used to complete the suspension of one end of each said rotatably suspended mirror bearing shaft member within and between said upright side walls of said housing assembly, thereby providing a means for imparting a horizontal tilting adjustment to said rotatably suspended mirror bearing shafts, the degree of said horizontal tilting adjustment being dependent upon the rotational position of said eccentric member, said horizontal tilting adjustment provides a means to independently control the placement in a horizontal fashion of said respective left and right eye stereo pair images upon said viewing screen surface, (j) a rectangular shaped front wall plate containing a top and a bottom openings, and flange members affixed to the outtermost front surface edges of said front wall plate, said flange members being capable of receiving and retaining other members constituting polarizing or other appropriate light filtering mediums, a centrally located screw member to retain and register said filter mediums in place upon said front wall, said front wall being mounted adjacent to and in front of said housing assembly in a vertical position with said openings being located at the top and bottom portions and aligned with the reflective areas of said rotatably suspended mirrors contained within said housing assembly, (k) a leveling indicator device adjustably attached in a convenient location upon the body of the invention, (l) a suitable chemical bonding substance, such as commercially available silicone glue, used to affix said reflecting mirror and other suitable members to their said respective bearing members, thereby providing a means to avoid a prolifera of labor intensive mechanical mounting components, said chemical substance also serving a dual function of absorbing kinetic energy thereby providing a means for protecting fragile or vibration sensitive members.

2. The device in claim 1 wherein the rotatably suspended uppermost and lowermost mirrors can have reflective coatings of the dichroic "cold" type thereby providing a means for protecting the polarizing or other filter mediums from heat damage.

3. The device in claim 1 wherein the innermost reflecting mirrors are rigidly positioned and fixed at an angle of 92 degrees from the "V" end, said 92 degree angle providing a means to limit or govern the physical size of said device.

4. The device in claim 1 wherein an extension provision means can be inserted between the mounting points of the housing assembly and the upright side walls of the attaching means, said extension provision means comprised of a rectangular shaped member containing substitute but identical mounting points for attachment to said attaching means, and alternative attaching points, which have been compensated to account for their own thickness, to said housing assembly to rigidly mount said extension member, there being one such said extension member on each side of said housing assembly and said attaching means.

5. The device in claim 1 wherein a compression spring member is mounted between the fixed uppermost "L" shaped member of the adjusting means assembly and the movably but captively mounted uppermost "T" shaped member, with a second compression spring member of substantial and different strength mounted between the lowermost fixed "L" shaped member and the lowermost movably but captively mounted "T" shaped member thereby providing a dual means of maintaining rigidity of adjustment of rotatably suspended mirror members and forcing cylindrically shaped micrometer roller member to favor contact with only one of the two said fixed "L" shaped members, thereby providing a foundation for all subsequent alignments and collimations.

6. An attaching means comprising:
(a) two upright side walls, a horizontal top wall, and a horizontal bottom wall formed as one unit,
(b) two protruding members rigidly attached to the innermost surface of the middle portion of said top wall, orientated front to back and facing downwardly with suitably fashioned surfaces forming a receiving means for cylindrically shaped objects such as a projection lens barrel, said receiving means being additionally fashioned to provide a means for accurately aligning said attaching means, and subsequently the housing assembly attached thereon, in a concentric and parallel manner to the longitudinal axis of said cylindrically shaped object being received,
(c) a movable but captively mounted plate member adjacent to the innermost surface of said bottom wall and facing upwardly,
(d) a rotatably threaded rod member introduced through a suitably threaded orifice located centrally on said bottom wall and in contact with the underside of said movable but captively mounted plate member thereby providing a means to raise or lower in a vertical manner said movable but captively mounted plate to provide a capability for receiving and grasping said cylindrically shaped objects,
(e) two or more additional threaded rod members rigidly affixed to said movable but captively mounted plate member and extending downwardly through suitable apertures in said bottom wall thereby providing a means to keep said movable but captively mounted plate member mobile but captive to said bottom wall.

7. The device in claim 6 wherein a leveling indicator device is affixed to an area specifically prepared to receive said leveling indicator device on the uppermost outside surface of the top horizontal wall of the attaching means thereby providing a means to accurately and quickly ascertain and establish a true horizontal rotational relationship of the device when mounted upon the projection lens barrel, thereby providing a means for insuring the correct placement upon the viewing screen in a horizontal fashion of the right and left eye stereo pair images being relayed and processed by said device.

8. The device in claim 6 wherein front and rear vertically mounted wall members are attached to the frontmost and rearmost surfaces of the attaching means, said front and rear wall members contain circular shaped openings capable of admitting a cylindrically shaped object into said attaching means, said front and rear wall members functioning as truss members thereby providing a means to resist flexure of horizontal top and bottom wall of said attaching means when the grasping means capability is activated.

9. The device in claim 6 wherein protruding interference members are removably mounted on the front outermost face of the attaching means thereby providing a means for arresting insertion of more length than is necessary of the cylindrically shaped object thereby providing a means for preventing damage to the inner horizontal "V" shaped mirror seam.

* * * * *